Patented July 23, 1940

2,209,246

UNITED STATES PATENT OFFICE 2,209,246

PROCESS OF ACCELERATING POLYMERIZATION

Walter Bauer, Darmstadt, and Ernst Trommsdorff, Jugenheim-on-the-Bergstrasse, Germany, assignors to Röhm & Haas Company, Philadelphia, Pa.

No Drawing. Application March 11, 1938, Serial No. 195,312. In Germany March 16, 1937

4 Claims. (Cl. 260—80)

This invention relates to a process of polymerizing compounds containing a $CH_2=C<$ group such as vinyl, acrylic and methacrylic esters and joint polymers containing them. It relates more particularly to a process of polymerizing such compounds in the presence of tetralin peroxide which acts as a catalyst.

The commercial exploitation of polymers of the above-mentioned type depends on having available suitable polymerization catalysts because, without powerful catalysts which can be used in small amounts, it would not be possible to prepare polymers with predetermined properties.

It is known that the polymerization of the vinyl, acrylic and methacrylic derivatives is accelerated by certain peroxides, both organic and inorganic such as the acyl peroxides, hydrogen peroxide and sodium peroxide. The acyl peroxides usually used are benzoyl, acetyl or mixed peroxides such as benzoyl-acetyl peroxide. In the preparation of colorless, transparent polymers, for example those used for glass substitutes or in laminated glass, the organic peroxides are preferred because they do not cause any cloudiness in the product.

It has now been found that tetralin peroxide has many advantages over the acyl peroxides heretofore used as catalysts for the polymerization of vinyl, acrylic and methacrylic derivatives, particularly where it is essential to produce polymers which are free of bubbles. As is well known, it is difficult to make polymers or joint polymers free of bubbles and a great deal of work has been done in attempting to overcome this difficulty when the usual acyl peroxide catalysts are employed. Tetralin peroxide can be used in such cases and is particularly effective in those instances where large amounts of catalyst are necessary. When large amounts of the older catalysts are used, it frequently happens that the reaction of polymerization proceeds with explosive violence. When tetralin peroxide is used, the reaction proceeds more smoothly and the chances of explosions are practically eliminated.

Another decided advantage of tetralin peroxide over the acyl peroxides is that it can be used in preparing polymers which are colored with soluble dyes that are changed in color or shade by the acyl peroxide. Tetralin peroxide has practically no effect on the dyes even though larger amounts of it are used than is usually the case with the acyl peroxides. For example, benzoyl peroxide, even in very low concentration, will change the color or shade of blue dyes during polymerization whereas tetralin peroxide has no effect on these sensitive colors.

Tetralin peroxide may be used to accelerate the polymerization of vinyl esters, ketones, ethers and the functional derivatives of acrylic and methacrylic acids such as the esters, anhydrides, amides, nitriles, etc. and styrene. It is very useful in preparing the transparent hard polymers such as those of methyl methacrylate and its joint polymers with other compounds of the types enumerated above, which are used for the preparation of glass substitutes. The amount of tetralin peroxide used will depend on the desired rate of polymerization and other conditions such as temperature, etc. and will vary between about 0.01% and 3.0% of the amount of the polymerizable material.

The usual fillers, pigments, colors, plasticizers etc. can be incorporated with any of the polymers produced according to the process described herein.

The invention may be illustrated by the following examples but it is not limited to the times, temperatures and polymerizable materials shown as it may be otherwise practiced within the scope of the appended claims.

The tetralin peroxide may be easily prepared by simply bubbling air through tetralin and, after sufficient of the peroxide has been formed, evaporating the liquid, preferably under reduced pressure.

Example 1

Methyl methacrylate containing 0.1% of tetralin peroxide is heated in a cell with movable walls (see U. S. Patent No. 2,091,615) set about 10 cm. apart, for one-half hour at 100° C. and then for 20 hours at 80° C. A bubble-free block about 10 cm. thick is obtained.

Example 2

(a) 0.01 part of dibenzoyl peroxide is added to a mixture of 60 parts of styrol and 40 parts of acrylic nitrile and this mixture is then heated in a cell one centimeter thick for 16 hours at 55°–65° C., followed by 4 hours at 90° C. The resulting sheet which is about one centimeter thick is full of bubbles.

(b) By substituting 0.50 part of tetralin peroxide for the dibenzoyl peroxide and heating under the same conditions, a bubble-free sheet is obtained in spite of the presence of fifty times as much catalyst.

Example 3

(a) Methyl methacrylate containing 0.02% of the blue dye Sudan blue G and 0.015% of dibenzoyl peroxide is heated until polymerized. A violet-red polymer is obtained. The intensity of the color varies considerably in an uncontrollable manner in successive batches.

(b) By substituting tetralin peroxide for the dibenzoyl peroxide in amount sufficient to give the same speed of polymerization a blue polymer is obtained which has the true color of the dye. In order to attain the same speed of polymerization the amount of tetralin peroxide required is about three times as great as in the case of dibenzoyl peroxide.

Example 4

Methyl methacrylate containing 0.05% of Blue B for acetylcellulose (Soc. Chem. Ind. Basle) when polymerized with 0.015% of dibenzoyl peroxide as the catalyst yields a red product but when tetralin peroxide is used the true blue color of the dye is retained.

Other dyes such as Sudan black BT and Alizarine cyanine green GWA behave in a similar manner.

The invention is applicable to all polymerizable functional derivatives of acrylic and methacrylic acids such as esters, anhydrides, halides, amides and nitriles; to vinyl esters, ethers and ketones and to styrene. Tetralin peroxide is equally effective when mixtures of two or more of the foregoing polymerizable materials are used. It may be used in the pure polymerizable materials or their mixtures and also in solutions of these in inert solvents as well as when the polymerization is carried out in aqueous emulsions.

Of the above-mentioned dyestuffs Blue B may be identified as No. 1314 of Schultz Farbentabellen, and Alizarine cyanine green GWA as No. 1201 of Schultz Farbentabellen (color index 1078).

We claim:

1. In the process of polymerizing a compound containing the $CH_2=C=$ group selected from the group consisting of styrene, esters, amides, nitriles, and anhydrides of acrylic and methacrylic acids, vinyl esters, ethers, and ketones and mixtures thereof, the improvement which comprises carrying out the polymerization in the presence of a small amount of tetralin peroxide.

2. In the process of polymerizing a compound containing the $CH_2=C=$ group selected from the group consisting of styrene, esters, amides, nitriles, and anhydrides of acrylic and methacrylic acids, vinyl esters, ethers, and ketones and mixtures thereof, the improvement which comprises carrying out the polymerization in the presence of from about 0.01 to about 3% of tetralin peroxide.

3. In the process of polymerizing methyl methacrylate, the improvement which comprises carrying out the polymerization in the presence of a small amount of tetralin peroxide.

4. In the process of polymerizing a mixture containing methyl methacrylate and another polymerizable material containing a $CH_2=C<$ group, the improvement which comprises carrying out the polymerization in the presence of a small amount of tetralin peroxide.

WALTER BAUER.
ERNST TROMMSDORFF.